United States Patent
Fesenmyer

(10) Patent No.: US 9,637,059 B2
(45) Date of Patent: May 2, 2017

(54) INTEGRATED SLIDING ARMREST AND HINGE ASSEMBLY SUBSYSTEM FOR A CONSOLE ASSEMBLY

(71) Applicant: FORD GLOBAL TECHNOLOGIES, LLC, Dearborn, MI (US)

(72) Inventor: Christopher Emery Fesenmyer, Flat Rock, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/599,730

(22) Filed: Jan. 19, 2015

(65) Prior Publication Data

US 2016/0207468 A1      Jul. 21, 2016

(51) Int. Cl.
| | |
|---|---|
| *B60R 7/04* | (2006.01) |
| *B29C 70/74* | (2006.01) |
| *B60N 2/46* | (2006.01) |
| *B29L 31/30* | (2006.01) |
| *B29K 77/00* | (2006.01) |
| *B29K 509/08* | (2006.01) |

(52) U.S. Cl.
CPC .............. *B60R 7/04* (2013.01); *B29C 70/74* (2013.01); *B60N 2/4646* (2013.01); *B29K 2077/00* (2013.01); *B29K 2509/08* (2013.01); *B29L 2031/3026* (2013.01)

(58) Field of Classification Search
CPC ......... B60R 7/04; B29C 70/74; B60N 2/4646; B29L 2031/3026; B29K 2509/08; B29K 2077/00
USPC .............. 296/24.34, 24.46, 37.8, 37.14, 1.09
See application file for complete search history.

(56) References Cited

U.S. PATENT DOCUMENTS

| | | | |
|---|---|---|---|
| 5,845,965 A * | 12/1998 | Heath ................. | B60N 2/4646 297/188.14 |
| 6,419,314 B1 | 7/2002 | Scheerhorn | |
| 6,719,367 B2 * | 4/2004 | Mic ..................... | B60N 2/4646 296/37.8 |
| 7,431,365 B2 * | 10/2008 | Sturt .................... | B60N 2/4686 224/539 |

(Continued)

FOREIGN PATENT DOCUMENTS

| | | |
|---|---|---|
| FR | 2933349 B1 | 2/2011 |
| JP | 2014008795 A | 1/2014 |
| KR | 100986391 B1 | 10/2010 |

OTHER PUBLICATIONS

English machine translation of the description for FR2933349.
English machine translation of the description for JP2014008795.
English machine translation of the description for KR100986391.

*Primary Examiner* — Jason S Morrow
*Assistant Examiner* — E Turner Hicks
(74) *Attorney, Agent, or Firm* — Vichit Chea; King & Schickli, PLLC

(57) ABSTRACT

A hinged sliding armrest subsystem for a motor vehicle console assembly includes a console storage compartment lid, a console storage compartment upper element, and a pivoting hinge connecting the console lid and the console storage compartment upper element, all fabricated as a unit. A molded track for receiving a sliding armrest may be included in the console storage compartment lid. A torque hinge may be included as a hinge pin for the pivoting hinge. At least the console storage compartment lid and the pivoting hinge are fabricated of a suitably durable and lubricious material.

13 Claims, 6 Drawing Sheets

(56) References Cited

U.S. PATENT DOCUMENTS

| | | |
|---|---|---|
| 7,731,258 B2 | 6/2010 | Bazinski et al. |
| 8,534,733 B2* | 9/2013 | Schreurs .................. 296/1.09 |
| 2012/0102677 A1* | 5/2012 | Koarai .............. E05D 11/087 |
| | | 16/337 |

\* cited by examiner

INTEGRATED SLIDING ARMREST AND HINGE ASSEMBLY SUBSYSTEM FOR A CONSOLE ASSEMBLY

TECHNICAL FIELD

This disclosure relates generally to motor vehicle consoles, and more particularly to a console assembly including an integrated sliding armrest and hinge subassembly.

BACKGROUND

Automotive vehicle consoles are well known in the art. Typically, the console is placed between the driver and front passenger seats, although rear seat consoles have become common in SUV's and some other larger vehicles. The console typically provides many functions, including an armrest, one or more storage compartments, one or more cup holders, and others. Often, an armrest portion of a motor vehicle console is hinged, to provide access to one or more storage areas disposed below the armrest. It is likewise known to provide a sliding armrest assembly for a motor vehicle, wherein the armrest portion of a console may be translated into a variety of forward and back configurations according to user preference.

Each of the elements of a typical motor vehicle console such as the armrest, storage bins, etc. are typically fabricated as separate elements, and then assembled to provide a finished console. This undesirably adds cost and complexity in the form of multiple molds, materials, and excess labor or other resources associated with assembling the finished product. In turn, conventional sliding armrest designs are often quite complex and so costly to fabricate and assemble. Excessively complex designs may be prone to damage and mechanical failure.

To solve these and other problems, the present disclosure relates to an integrated sliding armrest and hinge subassembly for a motor vehicle console. Advantageously, the subassembly is fabricated in a single molding process, reducing cost of fabrication/assembly and also providing a robust, simple mechanism providing a sliding armrest function with a minimal number of parts.

SUMMARY

In accordance with the purposes and benefits described herein, a hinged sliding armrest subsystem for a motor vehicle console assembly is provided, including a console storage compartment lid, a console storage compartment upper element, and a pivoting hinge connecting the console lid and the console storage compartment upper element. Advantageously, the console storage compartment upper element, console storage compartment lid, and pivoting hinge are fabricated as a unit. The console storage compartment lid may include a molded track for receiving a sliding armrest. In embodiments, a torque hinge may be included as a hinge pin for the pivoting hinge.

In embodiments relating to console assemblies including sliding armrests, at least the console storage compartment lid and the pivoting hinge may be fabricated of a lubricious material to ensure reduced friction at least at the hinge portion and between the sliding armrest and the console storage compartment lid. A guide plate may be attached to the console storage compartment lid for slidingly receiving a guide system defined in or attached to the sliding armrest.

In another aspect, a console subassembly including a sliding armrest for a motor vehicle is described, including a console storage compartment lid including a molded track, a console storage compartment upper element, and a pivoting hinge connecting the console storage compartment lid and the console storage bin upper element, fabricated as a unit as described above. A sliding armrest is operatively engaged with the console storage compartment lid for displacement between an extended position and a retracted position along the console lid molded track. A console storage compartment lower element is provided, configured to engage the storage compartment upper element to define a console storage compartment. A guide plate may be attached to the console storage compartment lid to slidingly receiving a guide system defined in or attached to the sliding armrest.

In yet another aspect, a method for making a sliding armrest subsystem for a motor vehicle console assembly is described, including providing a mold defining a unit including a console storage compartment lid, a console storage compartment upper element, and a pivoting hinge connecting the console storage compartment lid and the console storage compartment upper element. By the described mold, the finished console storage compartment upper element, console storage compartment lid, and pivoting hinge are formed as a unit. A suitable material is introduced into the mold to define the sliding armrest subsystem. A suitable hinge pin mechanism such as a torque hinge is disposed in a portion of the mold defining the pivoting hinge prior to introducing the material. The mold may further define a track in the console storage compartment lid for receiving a sliding armrest. In embodiments, a suitably durable and lubricious material is introduced into the mold to define the subsystem. In one embodiment, the material is a 30% short glass filled polyamide 66.

In the following description, there are shown and described embodiments of the disclosed integrated sliding armrest and hinge subassembly. As it should be realized, the assembly is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed integrated sliding armrest and hinge subassembly, and together with the description serve to explain certain principles thereof. In the drawing.

Reference will now be made in detail to embodiments of the disclosed integrated sliding armrest and hinge subassembly, examples of which are illustrated in the accompanying drawing figures.

DETAILED DESCRIPTION

Figure 1:
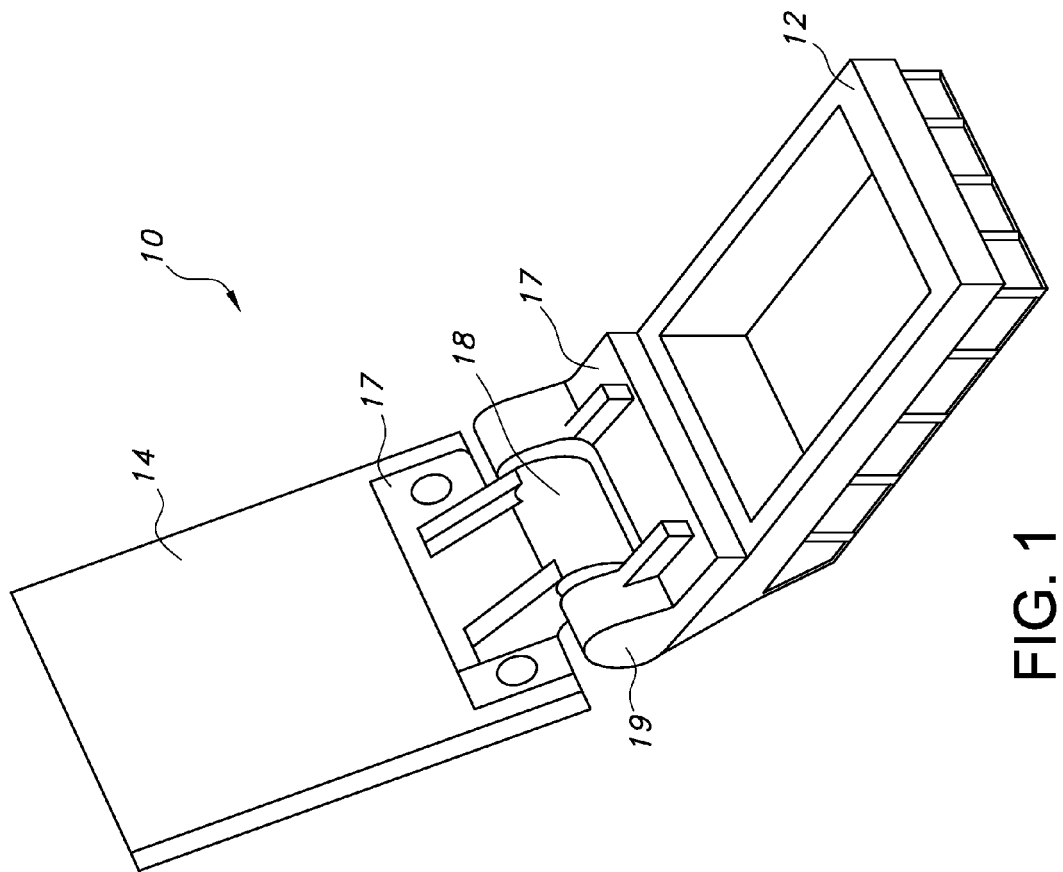
FIG. 1 depicts a prior art automotive console storage compartment and hinged lid, including a hinge mechanism provided separately.

With reference to FIG. 1, it is known to provide a storage compartment assembly 10 in an automotive console, typically including a storage compartment 12, a storage compartment lid 14, and a hinge mechanism 16 connecting the two. At a high level, a typical hinge includes wings 17, a pivoting portion 18 colloquially known as a "knuckle," and a hinge pin 19. Likewise, it is known to provide a sliding armrest (not shown in this view), often associated with a storage compartment lid by various mechanisms. These storage compartment assembly components are typically fabricated as separate parts made in separate molds, for example by injection molding techniques. Each separate mold represents an additional cost to the manufacturer. The various parts must then be assembled, adding to labor costs for the manufacturer.

Figure 2:
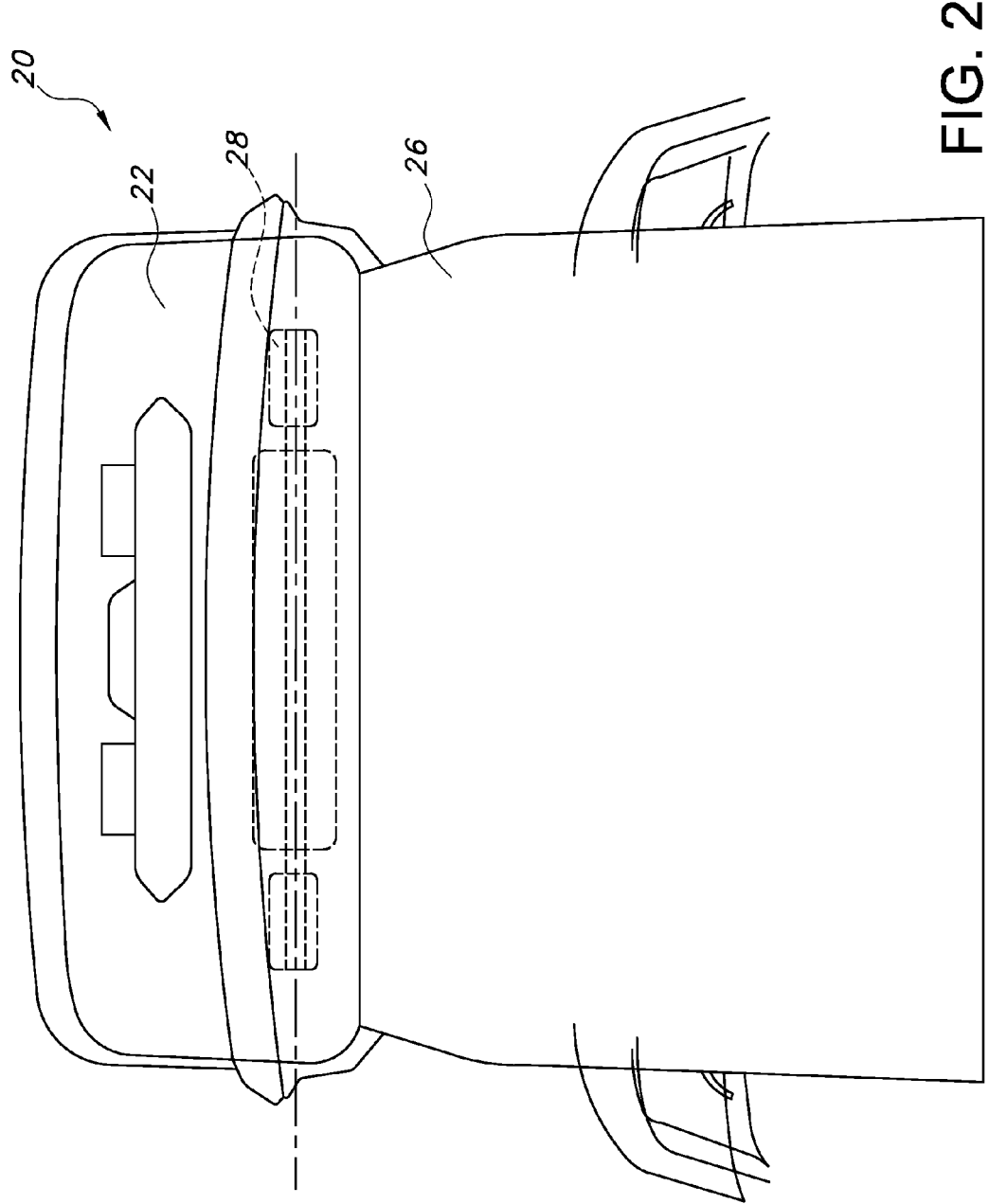
FIG. 2 depicts a rear view of an integrated automotive console storage compartment and lid according to the present disclosure.

To address the above-discussed issues of increased cost and labor requirements in assembling a storage compartment with hinged lid, the present disclosure relates to an integrated subsystem 20 providing a storage compartment and hinged lid for an automotive console. With reference to FIG. 2, the subsystem 20 includes a storage compartment hinged lid 22, a pivoting hinge 24, and a storage compartment upper element 26. A hinge pin 28 is included in the subsystem 20, typically a torque hinge mechanism of a type well-known in the art. As is known, a torque hinge (also known as a friction hinge, a positioning hinge, a constant torque hinge, etc.) provides a pivoting function over a predetermined angular range. Torque hinges also hold a pivoted object in a desired position by a friction force between an input and output shaft of the hinge mechanism when a pivoting force is not being applied. Suitable torque hinges for use in the present disclosure include without intending any limitation those manufactured by Reell Precision Manufacturing Corp., St. Paul, Minn.

Figure 3:
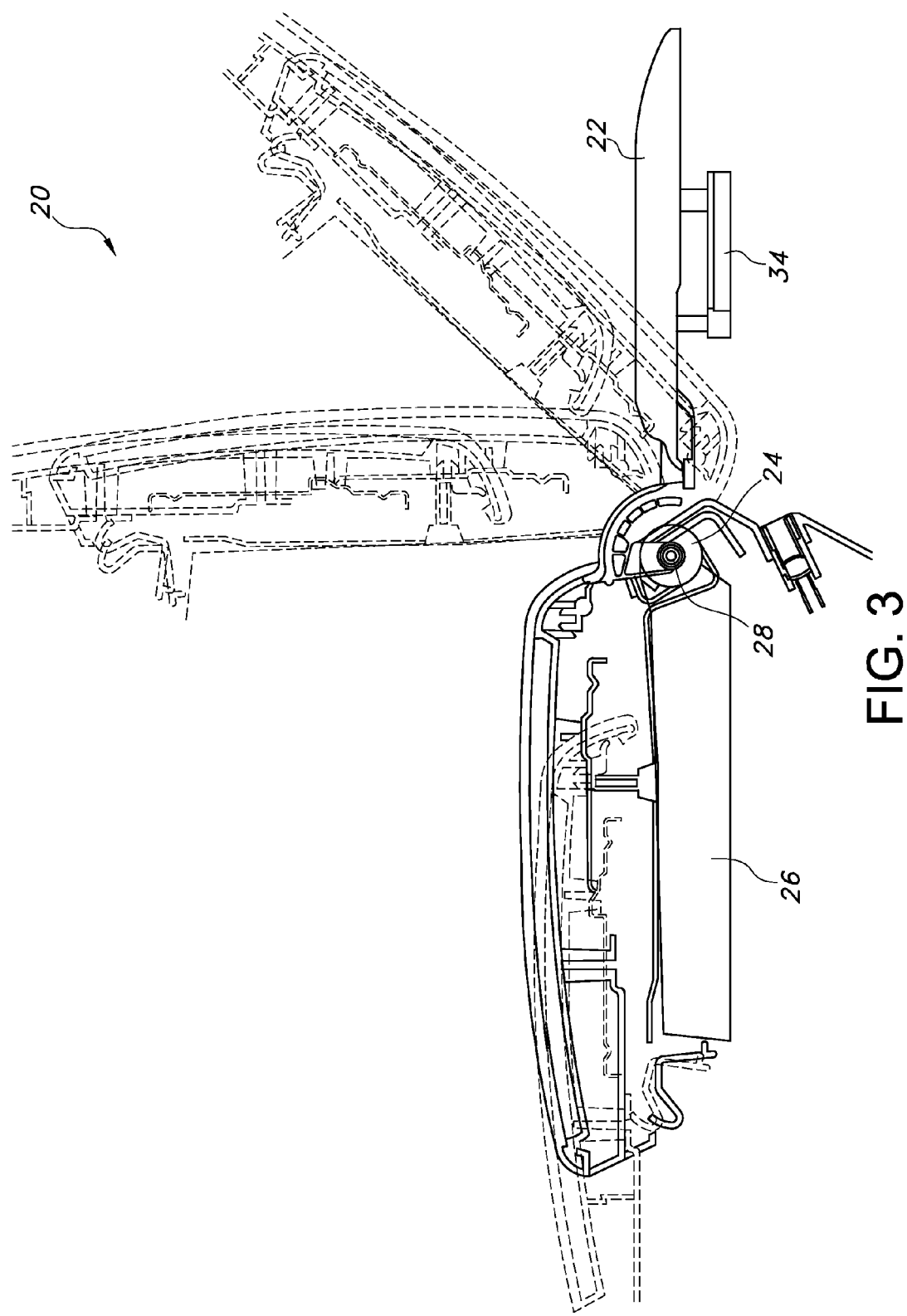
FIG. 3 depicts a side view of the integrated automotive console storage compartment and lid of FIG. 2, including a guide plate attached to the console storage bin lid.

Advantageously, the above subsystem 20 is fabricated as a unit. With reference to FIG. 3, a mold is provided which defines the above-described elements with the exception of the hinge pin 28. Hinge pin 28 (in the disclosed embodiment being a torque hinge as described, although other suitable hinge pin structures and devices are contemplated) is positioned in the portion of the mold which will define the pivoting hinge 24. A suitable material is then introduced into the mold, thereby defining the described storage compartment hinged lid 22, pivoting hinge 24, and storage compartment upper element 26. By this process, these elements of a storage compartment for an automotive console are provided as a substantially unitary fabrication. Any suitable molding technique as is known in the art is contemplated such as injection molding, rotational molding, blow molding, and compression molding, to name a few.

Figure 4:
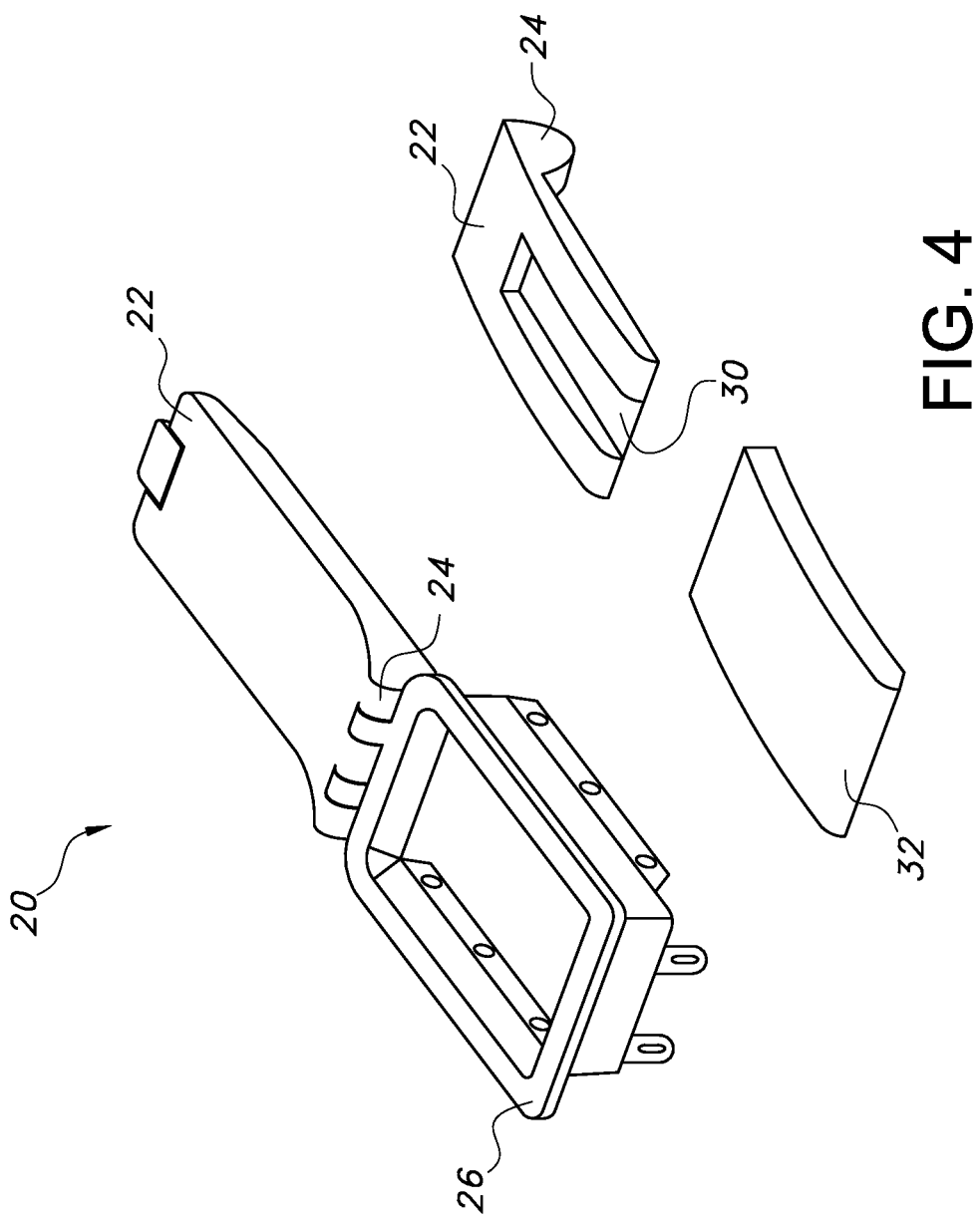
FIG. 4 depicts a front perspective view of an integrated automotive console storage compartment and lid according to the present disclosure, further including a sliding armrest for engaging the console storage compartment lid.

In embodiments providing a sliding armrest for an automotive console, the mold may also define a track 30 in a top surface of the storage compartment hinged lid 22, for slidingly receiving a sliding armrest 32 thereon (see FIG. 4). In embodiments providing a sliding armrest 32, a guide plate 34 (see FIG. 3) may be attached to a top surface of the storage compartment hinged lid 22 to slidingly engage a corresponding rail mechanism (not shown) associated with the sliding armrest 32. Although any suitable mechanism is contemplated, a nonlimiting example of such a sliding armrest guide plate and rail mechanism associated with a storage compartment of an automotive console is described in Ford Global Technologies, LLC's U.S. Pat. No. 7,731,258, the disclosure of which is incorporated herein by reference in its entirety.

A further feature of the present disclosure will now be described. Conventionally, elements such as hinged storage compartment lids, sliding armrests, etc. require various mechanisms to ensure smooth, reliable operation. To reduce the need for such mechanisms and to enhance the simplicity (and concurrently reduce the associated cost of fabrication) of the presently disclosed design, it is contemplated to utilize a suitably durable yet lubricious material in the process of molding the storage compartment hinged lid 22, pivoting hinge 24, and storage compartment upper element 26 as described above. By use of such materials, frictional forces between the elements of pivoting hinge 24 and between storage compartment lid 22 are significantly reduced, thereby reducing the need for additional mechanisms to ensure smooth and reliable operation. In an embodiment, use of a 30% short glass-filled polyamide 66 as a substrate for fabricating the above-described components is contemplated. However, it will be appreciated that other suitably durable and lubricious materials are known in the art and are contemplated for use as a substrate for the above-described molding process.

Figure 5:
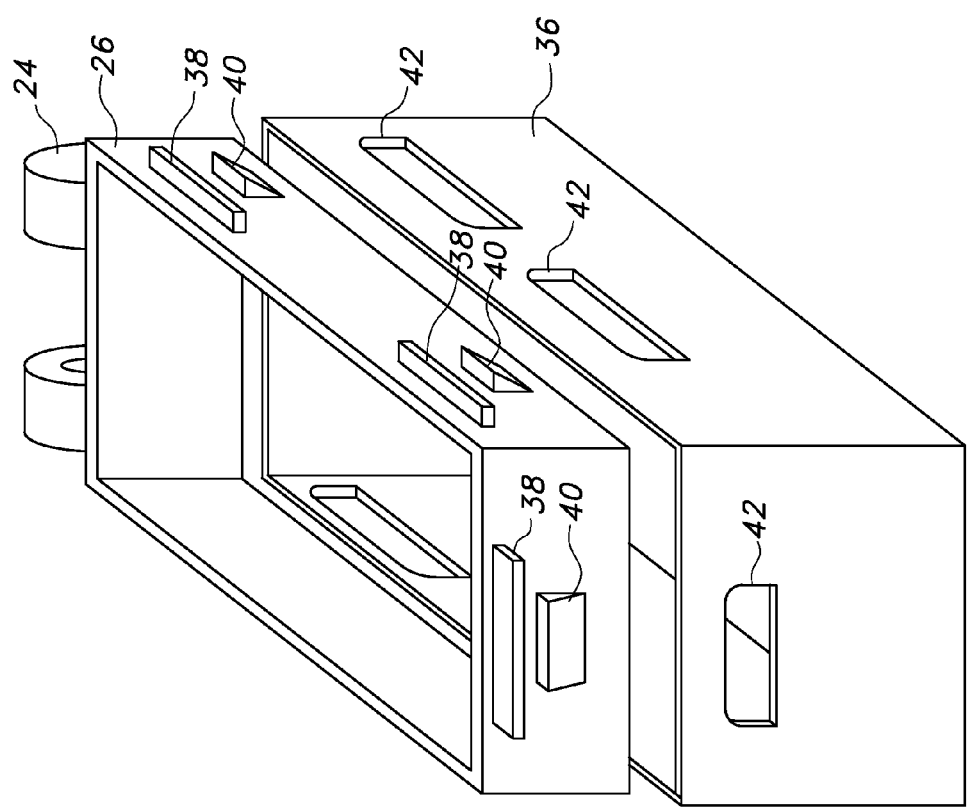
FIG. 5 depicts a storage compartment assembly according to the present disclosure, including a storage bin upper element and lower element.

A modular design for a storage compartment for an automotive console is contemplated. With reference to FIG. 5, storage compartment upper element 26 includes a snap-fit mechanism for attaching to a storage compartment lower element 36 which may define the main body of the console storage compartment. In one embodiment, the snap-fit mechanism includes stops 38 and flanges 40 disposed on sidewalls of the storage compartment upper element 26, for engaging cooperating apertures or recesses 42 defined in sidewalls of a storage compartment lower element 36. For assembly, the storage compartment upper element 26 need only be pressed into an interior of the storage compartment lower element 36 until the flanges 40 and apertures/recesses 42 engage. Any suitable non-releasing or releasing snap-fit mechanism as is known in the art is contemplated for use herein. However, it will also be appreciated that alternative mechanisms for securing the storage compartment upper element 26 to the storage compartment lower element 36 are possible and contemplated for use herein, including friction fit mechanisms, adhesives, mechanical fasteners, and combinations thereof.

Figure 6:
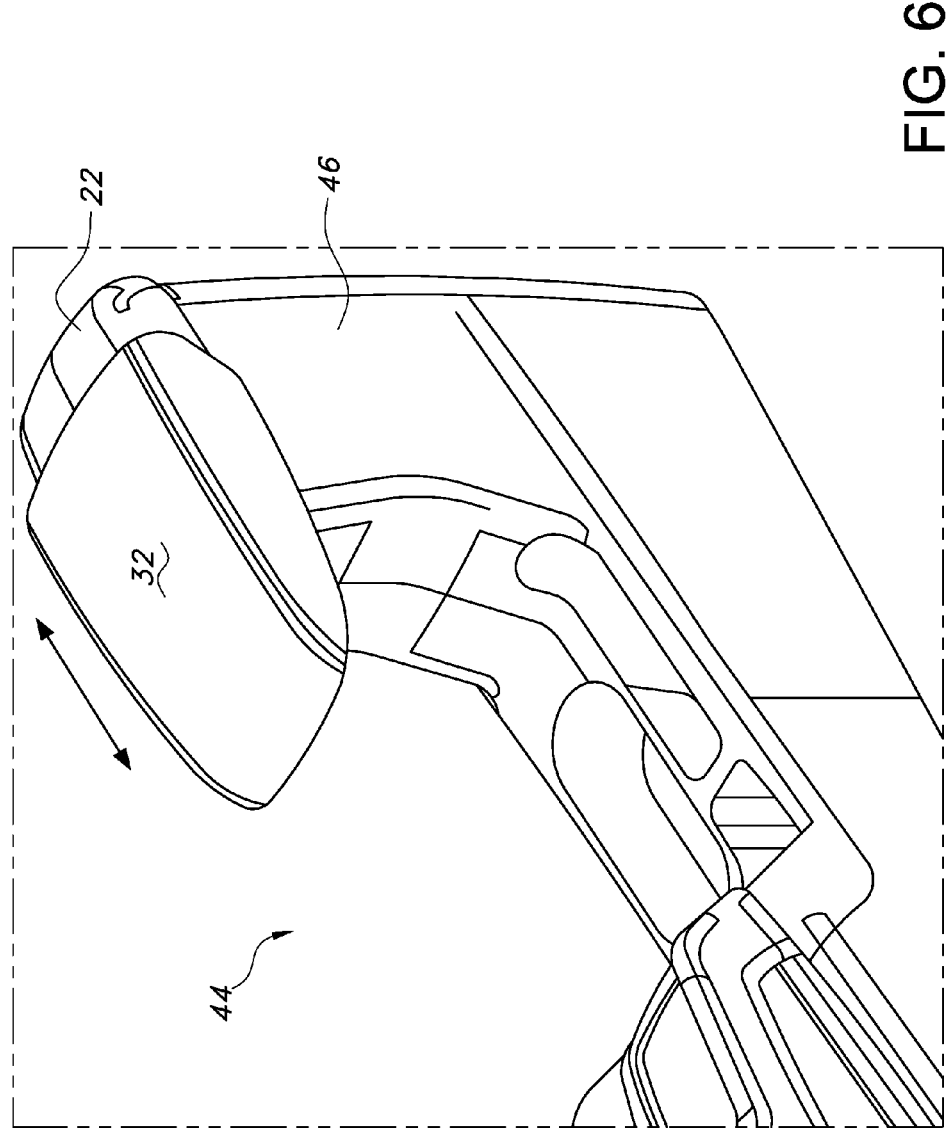
FIG. 6 depicts an automotive console including an integrated sliding armrest and hinge subassembly according to the present disclosure.

A finished console 44 for a motor vehicle (not shown) is depicted in FIG. 6. As shown the console 44 includes a storage compartment 46 provided as described above, and further includes a sliding armrest 32 secured to a storage compartment hinged lid 22 made as described. By use of the substantially unitary construction and lubricious materials as described, significant savings are realized both in infrastructure (mold) and labor costs, while still providing a functional, durable, and simple mechanism for portions of an automotive console.

Obvious modifications and variations are possible in light of the above teachings. All such modifications and variations are within the scope of the appended claims when interpreted in accordance with the breadth to which they are fairly, legally and equitably entitled.

What is claimed:

1. A hinged sliding armrest subsystem for a motor vehicle console assembly, comprising:
    a console storage compartment lid including a molded track for receiving a sliding armrest, said sliding armrest being operatively engaged with the console storage compartment lid;
    a console storage compartment upper element; and
    a pivoting hinge including a torque hinge as a hinge pin connecting the console lid and the console storage compartment upper element;
    the console storage compartment upper element, console storage compartment lid, and pivoting hinge being fabricated as a unit and wherein at least the console storage compartment lid and the pivoting hinge are fabricated of a lubricious material.

2. The subsystem of claim 1, wherein the lubricious material is 30% short glass filled polyamide 66.

3. The subsystem of claim 1, further including a guide plate attached to the console storage compartment lid for slidingly receiving a guide system defined in or attached to the sliding armrest.

4. A motor vehicle console assembly including the subassembly of claim 1.

5. A motor vehicle including the console of claim 1.

6. A console subassembly including a sliding armrest for a motor vehicle, comprising:
    a console storage compartment lid including a molded track;
    a sliding armrest operatively engaged with the console storage compartment lid for displacement between an extended position and a retracted position along the console storage compartment lid molded track;
    a console storage compartment upper element;
    a guide plate attached to the console storage compartment lid for slidingly receiving a guide system defined in or attached to the sliding armrest; and
    a pivoting hinge connecting the console storage compartment lid and the console storage bin upper element;
    the console storage compartment upper element, console storage compartment lid, and pivoting hinge being fabricated as a unit and wherein at least the console storage compartment lid and the pivoting hinge are fabricated of a lubricious material.

7. The console of claim 6, further including a console storage compartment lower element configured to engage the storage compartment upper element to define a console storage compartment.

8. The console of claim 6, further including a torque hinge as a hinge pin for the pivoting hinge.

9. The console of claim 6, wherein the lubricious material is 30% short glass filled polyamide 66.

10. A motor vehicle including the console of claim 6.

11. A method for making a sliding armrest subsystem for a motor vehicle console assembly, comprising:
    providing a mold defining a unit including a console storage compartment lid, a track in the console storage compartment lid for receiving a sliding armrest, a console storage compartment upper element, and a pivoting hinge connecting the console lid and the console storage compartment upper element whereby the finished console storage compartment upper element, console storage compartment lid, and pivoting hinge are formed as a unit; and
    introducing a lubricious material into the mold to define the sliding armrest subsystem.

12. The method of claim 11, further including disposing a torque hinge in a portion of the mold defining the pivoting hinge prior to introducing the material to provide a hinge pin for the pivoting hinge.

13. The method of claim 11, wherein the material is a 30% short glass filled polyamide 66.

* * * * *